United States Patent
Tate et al.

(10) Patent No.: US 6,467,035 B2
(45) Date of Patent: Oct. 15, 2002

(54) SYSTEM AND METHOD FOR PERFORMING TABLE LOOK-UPS USING A MULTIPLE DATA FETCH ARCHITECTURE

(75) Inventors: Larry R. Tate, South Barrington, IL (US); Mark Thierbach, Allentown, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 64 days.

(21) Appl. No.: 08/925,607

(22) Filed: Sep. 8, 1997

(65) Prior Publication Data

US 2002/0042869 A1 Apr. 11, 2002

(51) Int. Cl.$^7$ ................................................. G06F 9/35
(52) U.S. Cl. ........................ 711/168; 711/220; 711/221
(58) Field of Search ................................. 711/168, 220, 711/169, 217, 221; 712/205, 206, 207

(56) References Cited

U.S. PATENT DOCUMENTS

| | | | | |
|---|---|---|---|---|
| 4,439,827 A | * | 3/1984 | Wilkes | 364/200 |
| 5,150,471 A | * | 9/1992 | Tipon et al. | 395/400 |
| 5,165,026 A | * | 11/1992 | Kusakabe | 395/375 |
| 5,233,694 A | * | 8/1993 | Hotta et al. | 395/375 |
| 5,577,230 A | * | 11/1996 | Argade et al. | 395/477 |
| 5,829,049 A | * | 10/1998 | Walker et al. | 711/168 |
| 5,860,130 A | * | 1/1999 | Yamanaka et al. | 711/169 |
| 5,961,637 A | * | 10/1999 | Sturges et al. | 712/235 |

* cited by examiner

Primary Examiner—Kevin Verbrugge

(57) ABSTRACT

A novel table look-up/indirect addressing system and method uses a dual fetch Harvard architecture to accomplish one full table look-up access per instruction cycle. The offset access fetch, the indirect data fetch and the table offset and base address addition are all performed during a single cycle. The system and method also accommodate data accesses using packed (half word) offsets.

13 Claims, 4 Drawing Sheets

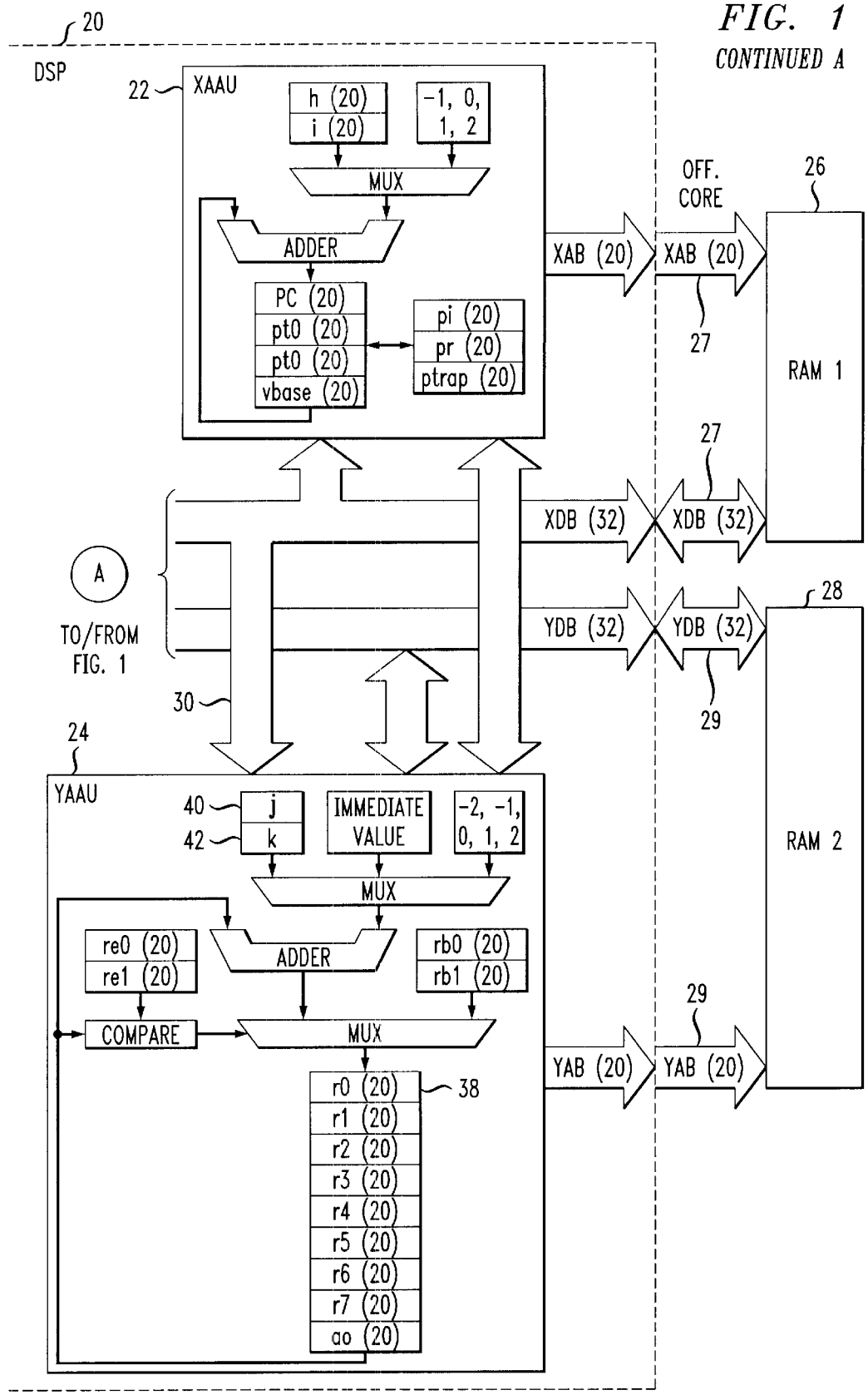
FIG. 1 CONTINUED A

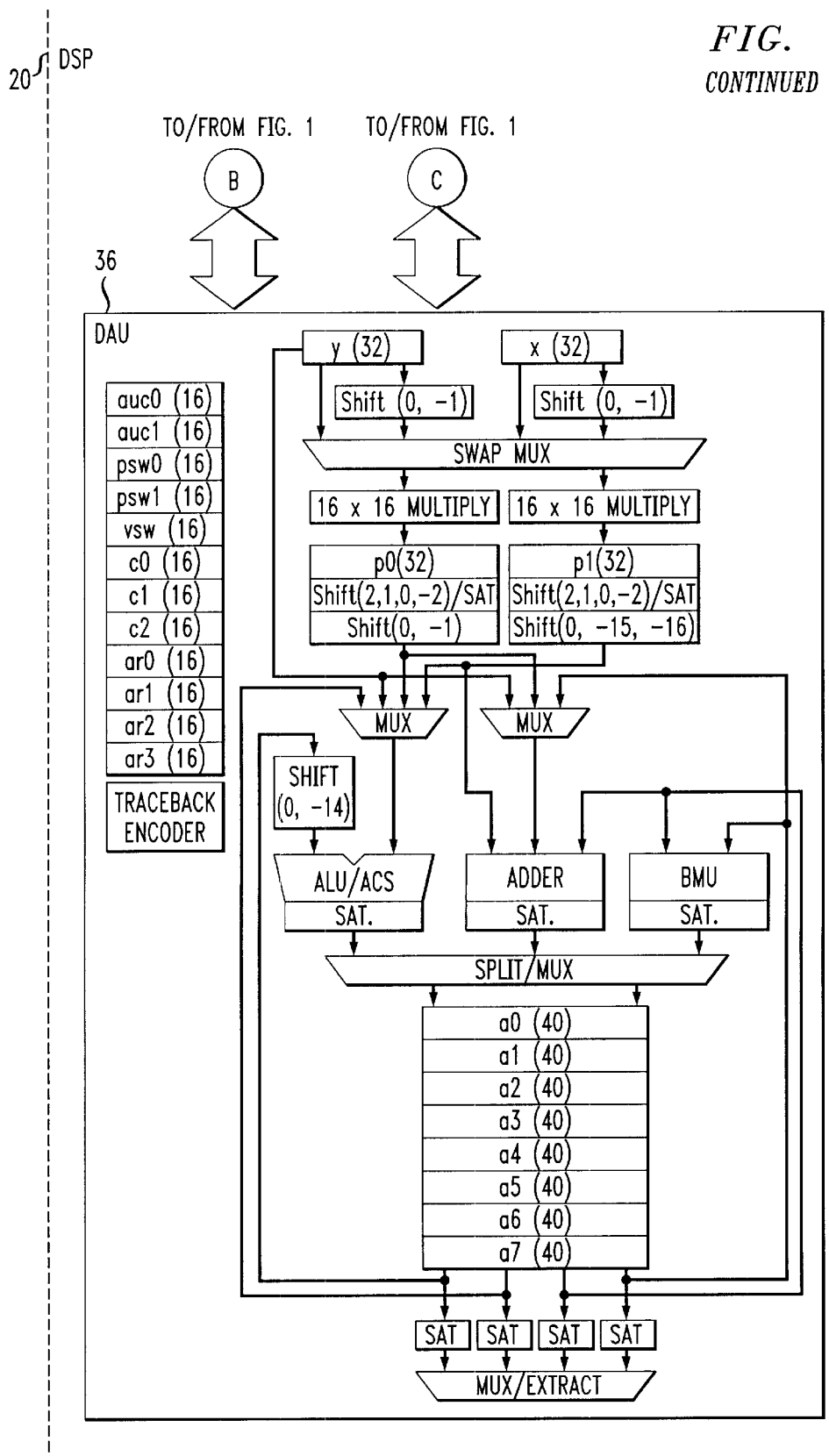
FIG. 1 CONTINUED B

SYSTEM AND METHOD FOR PERFORMING TABLE LOOK-UPS USING A MULTIPLE DATA FETCH ARCHITECTURE

FIELD OF THE INVENTION

The present invention relates to a system and method for accessing data from a data memory and, more particularly, to a system and method that accomplishes indirect address table look-ups in a single instruction cycle.

BACKGROUND OF THE INVENTION

Data processing devices such as digital signal processors and microprocessors are key components of most electronic equipment in use today. While the tasks performed by these devices is, at times, incredibly complex, the basic operation of these devices is not. To accomplish tasks of great complexity, the devices perform a large number of relatively simple operations very quickly. For example, a typical digital signal processor ("DSP") performs millions of operations each second.

The operations performed by a data processing device (referred to hereafter as a "data processor") are controlled by a series of instructions that are executed by the data processor. An instruction specifies the operation to be performed and may include parameters to be used during the associated operation. Typical instructions define operations such as adding one item of data (typically referred to as a word of data) to another word of data or moving a word of data from one location in data memory to another location.

Inasmuch as the basic operation of a data processor consists of the manipulation of data, a significant percentage of its operations involve retrieving data from and sending data to data memory. In its simplest form, a data access instruction specifies the address at which the data resides in the memory. Upon execution of this instruction, the data processor retrieves the data at the specified address.

To perform more robust tasks, the data processor may use a more complicated form of addressing referred to as "indirect addressing." Indirect addressing allows programmers to specify locations of data, without knowing the physical address at which the data is actually stored. For example, in a data memory with one million data locations, one thousand contiguous data locations may be designated as a data table. The address of the first data location in the table is referred to as the "base address" of the table. Data within the table can be accessed by reference to an "offset" from the base address. Thus, the first data location would be identified by offset=0, the second data location by offset=1, and so forth.

To perform an indirect address data memory access, the data processor combines the offset and the base address. Typically, this involves performing the operations of reading the offset from a data memory, adding the offset to the (previously obtained) base address, and accessing the data memory location specified by the combined address.

Conventional data processors require several instructions to accomplish an indirect addressing data access. For example, a DSP sold under the product name "TMS320C54x" by Texas Instruments requires several cycles to perform the indirect addressing operation described above. See, for example, Table 7-2 in the TMS320C54x 1995 User's Guide. Similarly, a DSP sold under the product name "DSP16" by Lucent Technologies, may require five instruction cycles per table look-up access. See, for example, the bit reverse operation in the WE® DSP16 and DSP16A Application Software Library Reference Manual.

Given the relatively large number of indirect memory accesses that may be performed by these data processors, a need exists for a data processor that can more efficiently perform data accesses using indirect addressing.

The invention provides an improved table look-up/indirect addressing system and method. The invention makes use of a dual-fetch Harvard architecture for a processor to implement one full table look-up access per instruction cycle.

The dual-fetch Harvard architecture provides two data paths that can be accessed during the same clock cycle. The invention uses these two data paths to access the offset and the data, respectively.

To accomplish a full table look-up during one clock cycle, the invention accesses data using a data pipeline. That is, the offset data accessed during a previous cycle is used during the current cycle to retrieve the data from the table. During each clock cycle, the invention reads a data word from a data memory using the address calculated during the previous cycle, adds the base address of the table to the offset obtained during the previous cycle, and reads the next offset from a data memory.

BRIEF DESCRIPTION OF THE DRAWINGS

These and other features of the invention will become apparent from the following detailed description of the preferred embodiments when taken with the accompanying drawings, in which.

DESCRIPTION OF PREFERRED EMBODIMENTS

A digital signal processor (DSP) is a special-purpose CPU utilized for digital processing and analysis of signals from analogue sources, such as sound. The analog signals are converted into digital data and analyzed using various algorithms, such as Fast Fourier Transforms. DSPs are designed for particularly fast performance of certain operations, such as multiplication, multiplying and accumulating, and shifting and accumulating, because the math-intensive processing applications for DSPs rely heavily on such operations. For this reason, a DSP will typically include special hardware circuits to perform multiplication, accumulation and shifting operations.

One popular form of DSP architecture is known as a Multiply-Accumulate or MAC processor. The MAC processor implements an architecture that takes advantage of the fact that the most common data processing operations involve multiplying two values, then adding the resulting value to another and accumulating the result. These basic operations are efficiently carried out utilizing specially configured, high-speed multipliers and accumulators, hence the "Multiply-Accumulate" nomenclature. In order to increase the processing power of MAC processors, they have been designed to perform different processes concurrently. Towards this end, DSP architectures with plural MAC structures have been developed. For example, a dual MAC processor is capable of performing two independent MAC operations concurrently.

Figure 1:
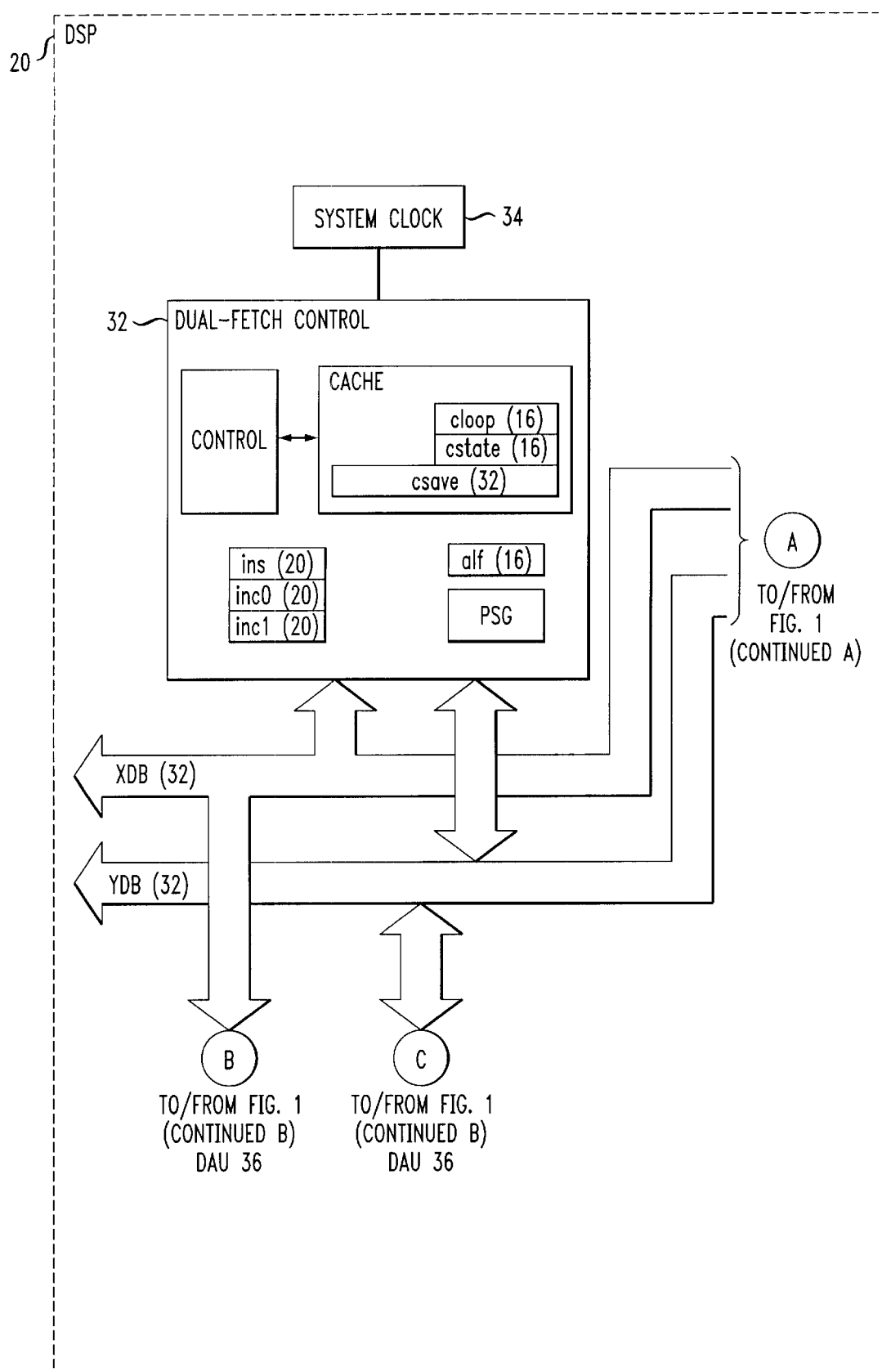
FIG. 1 is a block diagram illustrating one embodiment of a digital signal processor data processing core used to practice the present invention.

FIG. 1 depicts a digital signal processor ("DSP") 20 incorporating a dual-fetch Harvard architecture that is used to implement the invention. Two addressing units, X arithmetic addressing unit ("XAAU") 22 and Y arithmetic addressing unit ("YAAU") 24, are configured to access data stored in two random access memories: RAM1 26 and RAM2 28, respectively. The XAAU 22 is configured to access the table offset from RAM1 26 via bus 27. The YAAU 24 is configured to access table data from RAM2 28 via bus 29. A data path 30 is provided for sending offset data from the XAAU 22 to the YAAU 24. A dual-fetch control 32, driven by a system clock 34, controls the operation of the addressing units (22 and 24). Data retrieved from the table in the RAM2 28 may be sent to the digital signal processor's data arithmetic unit ("DAU") 36 for further processing.

Referring now to FIG. 1, the present invention may be implemented in a wide range of digital signal processing applications. Preferably the invention is incorporated in a data arithmetic unit ("DAU"), 36, for use in a dual-MAC processor.

The DAU includes dual 32-bit registers x(32) and y(32) that are operated as four 16-bit registers yh, yl, xh and xl when used providing the inputs to two signed 16-bit×16-bit multipliers M1 and M2. The respective multipliers produce respective 32-bit results stored into respective product registers p0(32) and p1(32). The product registers communicate with a 32-bit data bus IDB(32) that serves as the primary data path for the data arithmetic unit.

The data stored in the respective product registers p0(32) and p1(32) may undergo arithmetic register shifts and are fed through multiplexers MUX to either a 40-bit arithmetic-logic-unit ALU with an add/compare/select feature ALU/ACS, a 40-bit manipulation unit BMU, or a 40-bit 3-input adder/subtractor ADDER. The arithmetic unit implements addition, subtraction, and various logical operations. The bit manipulation unit implements barrellshifts, bit insertion and extraction, and normalization. As a complement to the arithmetic and bit manipulation units, the adder performs general addition and subtraction operations. Concurrent multiply and accumulation operations may be achieved by using the two multipliers, the ALU and the ADDER.

Respective saturator units SAT disposed at the outputs of the respective arithmetic, bit manipulation and adder units ALU, BMU and ADDER enable overflow saturation to modify the respective results. The overflow saturation feature also optionally affects accumulator values as the data is transferred to memory or to one or more registers. This feature accommodates various speech coding standards such as Global System Modulation, or GSM, vocoders at full, half and enhanced full rates. Moreover, shifting in the arithmetic pipeline occurs at several stages to accommodate various standards for extended-precision multiplications.

The modified results from the respective saturators SAT are then fed through a split multiplexer SPLITMUX to a register array comprising eight 40-bit accumulators a0 through a7, each including a high part and a low part.

The data arithmetic unit DAU also conveniently includes a plurality of 16-bit, bus-accessible control registers including counters c0–c2, arithmetic unit control registers auc0 and auc1, processor status words psw0 and psw1, auxiliary registers ar0–ar3, and a Viterbi support word vsw.

The invention achieves improved performance in the time required to perform a table look-up access by setting up a pipeline where the pointer offset values are fetched from the X-space (the coefficient side of the DSP; i.e., RAM1 26) while, simultaneously, the data values are being fetched from the Y-space (the data side; i.e., RAM2 28). The operation of the invention can be further understood by considering the assembly language syntax for the associated instructions. The pipelined table look-up instruction takes one of the following forms:

| 1. F1X | y[h]= *r0 | r0 = rNX + j | j = k | k = XX |
|---|---|---|---|---|
| 2. F1X | y[h]= *r0 | r0 = rNX + jlb | j = k | k = XX |
| 3. F1X | y[h]= *r0 | r0 = rNX + jhb | | |

The first encoding is the simplest and is used where the table of offset values that specify the locations in the data table from which data is to be fetched is stored as full-word (16 bit) signed integers. The second and third encodings are used when the table of offset values are stored as pairs of packed unsigned 8 bit integers. The latter case typically is used to save space in memory (e.g., RAM1 26).

Figure 2:
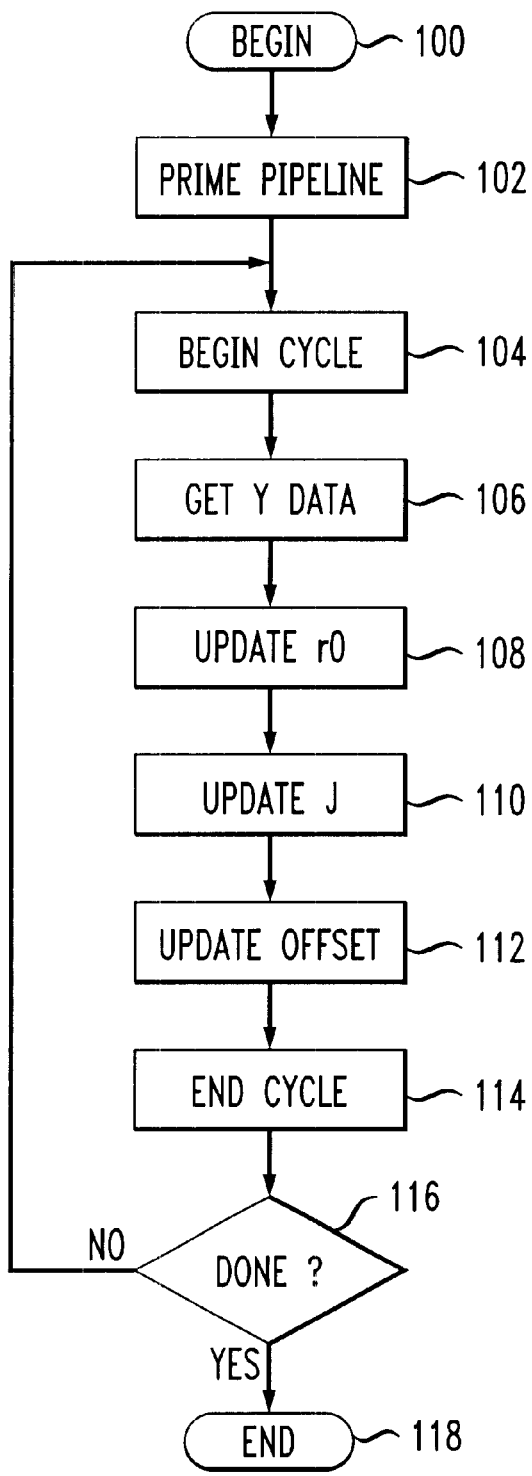
FIG. 2 is a flowchart of a table look-up access method according to the present invention.

Referring to FIG. 2, the operation of the first encoding case is treated beginning at block 100. The pipelined operation described in the assembly language above can be interpreted by reading the operations from left to right and assuming sequential operation in data assignments (even though all operations on the line really occur simultaneously in a single cycle). At block 102, the pipeline is primed so that valid data will be retrieved from the table during subsequent cycles. The priming operation will be treated in more detail later.

Block 104 and block 116 define the beginning and end, respectively, of an instruction cycle (i.e., the clock cycle defined by the system clock). Thus, all of the operations from block 106 through block 114 occur effectively in sequence (yet in a single cycle). At block 106, the value currently pointed to by the old value (i.e., the value stored during a prior instruction cycle) of r0 38 (FIG. 1) is fetched into y (for a 32 bit fetch) or yh (for a 16 bit fetch). That is, the data is read from RAM2 28 and into the YAAU 24. This is the second operation shown in the code. The first one is of no consequence to the invention, but it is interesting to note that additional concurrent processing is available. At block 108, the value in pointer r0 38 is updated to point to rNX (the pointer to the start of the data table) plus the (old) value in the j register 40 (FIG. 1). This is the third operation in the code.

At block 110, the j register 40 is updated to equal the (old) value in the k register 42 (FIG. 1). This is the fourth operation in the code. The operation of block 110 is only used because of the architecture of the system of FIG. 1. The use of the k register 42 could be eliminated in other embodiments, thereby reducing the pipeline to only two cycles.

At block 112, a new k register value (a new table offset) is fetched from coefficient space (i.e., RAM1 26). This is step 5 in the code. The XX field (in the assembly language above) represents a coefficient pointer access with an optional post-modify mode, as in k=*pt0++. This notation means that the k register is loaded with the contents of the memory location pointed to by pt0, then the contents of pt0 are incremented. If the embodiment without the k register 42 as described above in conjunction with block 110 were used, a new j register value would be updated at block 112, instead of the k register value.

At block 116, the table look-up operation is repeated, as necessary. The operation then terminates at block 118.

Due to the pipeline, each data access occurs two cycles after the pointer offset load. Thus, the instruction must be executed three times before the pipeline is fully primed with valid data. Nevertheless, once the pipeline is filled, an entire table look-up is achieved each clock cycle, including both the offset fetch and the data fetch.

The second and third encoding cases work in the same basic manner as discussed above for the first case, except that each X-space offset fetch actually fetches two offsets (two offsets are packed into one data word). In these cases, an X-space fetch is only needed every other cycle. In one implementation, the second and third encodings are thus executed alternately. The system uses the lower byte of the offset (jlb) in one cycle and the upper byte (jhb) the next cycle and keeps the offset pipeline primed at one packed word every two cycles.

The following example illustrates the use of the invention in a typical program. This example illustrates the use of packed 8 bit table offsets:

```
pt0=offset_list
                /* points to a list of table offsets */
                /* (8 bit offsets, packed into 16 bit words) */
r4=table_base
                /* points to the start of the data table */
r3=result
                /* points to location to store result */
a1=0
                /* used to accumulate the selected data entries */
y=*r0 r0=r4+jlb j=k k=*pt0++
                /*get first pair of offsets into k */
j=k
                /* copy to j register for first pointer offset calculation */
y=*r0 r0=r4+jhb
                /* perform first offset calculation (upper 8 bits of j) */
y=*r0 r0=r4+jlb j=k k=*pt0++
                /* first valid data fetch to y */
do 5 {          /* pipe is now primed; sum up ten actual data values */
        a1=a1+y y=*r0 r0=r4+jhb
                /*fetch data, perform offset calculations */
        a1=a1+y y=*rO r0=r4+jlb j=k k=*pt0++
                /*fetch data, next two offsets, perform next offset calculation */
}
*r3=a1          /*save the result of the sum to memory */
```

This program computes the sum of ten data entries in the data table (RAM2 28) pointed to by ten arbitrary offsets stored in the offset_list array (RAM1 26). The first four instructions perform register initialization. The next three instructions prime the pipeline for the ten data fetches and adds. The next instruction and the ensuing "do" loop perform the ten sums in a fully pipelined manner. At the end of the loop, the result is left in the register a1. Once the pipeline is primed, each full table look-up is performed in a single cycle.

The present invention provides improved performance in the operation of fairly recent DSP algorithms that require data to be fetched from a look-up table of data values, where the offsets into the table do not follow a simple pattern and, as a result, must be computed at run-time. A typical use of a data look-up table is the last stage of a Fast Fourier Transform operation. At this stage, the frequency sample binaries have been calculated, but are bit reversed. The look-up table is used to put the binaries in the proper order. Another example relates to reordering the data bits that are associated with a frame but are received out of sequence. Again, the look-up table is used to put the data in the proper order.

The invention provides a significant advantage over traditional DSPs since they typically do not include a pointer offset access mode. Moreover, the invention provides more efficient table look-ups than conventional microprocessors due to the use of the dual fetch Harvard architecture in the invention.

From the above, it may be seen that the disclosed invention provides an effective system and method that can perform table look-ups in a single cycle. While certain specific embodiments of the invention are disclosed as typical, the invention is not limited to these particular forms, but rather is applicable broadly to all such variations as fall within the scope of the appended claims. Many modifications and adaptations will occur to those skilled in the art to which the invention pertains. For example, various architectures, data processing components, data memory components and programming languages may be used in practicing the claimed invention. Thus, the specific structures and methods discussed in detail above are merely illustrative of a few specific embodiments of the invention.

What is claimed is:

1. A method for use with a data processing system for accessing data from a first memory using indirect addressing, the data processing system comprising a first data path associated with the first memory for retrieving data words thereform in accordance with the indirect addressing and a second data path associated with a second memory for retrieving offsets thereform for use in the indirect addressing, the first and second data paths being capable of independent and substantially simultaneous operation such that a data word can be retrieved from the first memory via the first data path during the same instruction cycle in which an offset is retrieved from the second memory via the second data path, the method comprising:

during a given one of a plurality of instruction cycles of the data processing system, performing a plurality of steps including:

retrieving during the given instruction cycle a data word from the first memory via the first data path of the data processing system using a first data address computed at least in part during a previous one of the instruction cycles;

computing during the given instruction cycle a second data address as a function of a base address and a first offset, the first offset being retrieved from the second memory via the second data path of the data processing system during one of (i) the previous one of the instruction cycles, and (ii) another one of the instruction cycles prior to the previous instruction cycle, the second data address being used in another of the instruction cycles subsequent to the given instruction cycle to retrieve another data word from the first memory via the first data path; and retrieving during the given instruction cycle a second offset from the second memory via the second data path, the second offset being used in the other of the instruction cycles subsequent to the given instruction cycle to compute a third data address as a function of the base address and the second offset.

2. The method of claim 1 further including the step of priming a pipeline for retrieval of multiple data words from the first memory, the pipeline operating over at least a portion of the plurality of instruction cycles, with each of the instruction cycles subsequent to the priming step comprising the steps of retrieving the first data word, computing the second data address and retrieving the second offset.

3. The method of claim 1 wherein a data word retrieved during a given instruction cycle n of the plurality of instruction cycles is retrieved from a data address as computed during an immediately previous instruction cycle n-1, the computation during previous instruction cycle n-1 using an offset retrieved from the second memory during an instruction cycle m-2 immediately prior to the previous insruction cycle n-1.

4. The method of claim 1 wherein the first offset used during the given instruction cycle to compute the second data address comprises a full-word offset and is rerieved from the second memory during an instruction cycle that is immediately prior to the given instruction cycle.

5. The method of claim 1 wherein the first offset used during the given instruction cycle to compute the second data address comprises a half-word offset and is retrieved along with another half-word offset from the second memory during an instruction cycle that is two cycles prior to the given instruction cycle.

6. The method of claim 1 wherein during the given one of the instruction cycles, the step of retrieving the second memory via the second data path further comprises the step of retrieving the second offset and a third offset from the second memory, the second offset being used in a subsequent instruction cycle to compute a new data address and the third offset being used in another instruction cycle following the subsequent instruction cycle to compute another new data address, such that no offset need be retrieved from the second memory in the subsequent instruction cycle.

7. A data processing system for accessing data from a first memory using indirect addressing, the system comprising:

a first data path associated with the first memory for use in retrieving data words thereform in accordance with the indirect addressing;

a second data path associated with a second memory for use in retrieving offsets thereform for use in the indirect addressing, the first and second data paths being capable of independent and substantially simultaneous operation such that a data word can be retrieved from the first memory via the first data path during the same instruction cycle in which an offset is retrieved from the second memory via the second data path; and a controller coupled to the first and second data paths, wherein the controller is operative during a given one of a plurality of instruction cycles of the data processing system to direct the retrieval during the given instruction cycle of a data word from the first memory via the first data path of the data processing system using a first data address computed at least in part during a previous one of the instruction cycles, wherein during the given instruction cycle a second data address is computed as a function of a base address and a first offset, the first offset being retrieved from the second memory via the second data path of the data processing system during one of (i) the previous one of the instruction cycles, and (ii) another one of the instruction cycles prior to the previous instruction cycle, the second data address being used in another of the instruction cycles subsequent to the given instruction cycle to retrieve another data word from the first memory via the first data path, and to direct the retrieval during the given instruction cycle of a second offset from the second memory via the second data path, the second offset being used in the other of the instruction cycles subsequent to the given instruction cycle to compute a third data address as a function of the base address and the second offset.

8. The system of claim 7 wherein a pipeline is utilized for retrieval of multiple data words from the first memory, the pipeline operating over at least a portion of the plurality of instruction cycles, with each of the instruction cycles subsequent to the priming of the pipeline including retrieval of the first data word, computation of the second data address and retrieval of the second offset.

9. The system of claim 7 wherein a data word retrieved during a given instruction cycle n of the plurality of instruction cycles is retrieved from a data address as computed during an immediately previous instruction n-1, the computation during previous instruction cycle n-1 using an offset retrieved from the second memory during an instruction cycle n-2 immediately prior to the previous instruction cycle n-1.

10. The system of claim 7 wherein the first offset used during the given instruction cycle to compute the second data address comprises a full-word offset and is retrieved from the second memory during an instruction cycle that is immediately prior to the given instruction cycle.

11. The system of claim 7 wherein the first offset used during the given instruction cycle to compute the second data address comprises a half-word offset and is retrieved along with another half-word offset from the second memory during an instruction cycle that is two cycles prior to the given instruction cycle.

12. The system of claim 7 wherein during the given one of the instruction cycles, the step of retrieving the second offset from the second memory via the second path further comprises the step of retrieving the second offset and a third offset from the second memory, the second offset being used in a subsequent instruction cycle to compute a new data address and the third offset being used in another instruction cycle following the subsequent instruction cycle to compute another new data address, such that no offset need be retrieved from the second memory in the subsequent instruction cycle.

13. A data processing system for accessing data using indirect addressing, the system comprising:

a first memory for storing data words;

a first data path coupled to the first memory for use in retrieving data words thereform in accordance with the indirect addressing, the first data path having associated therewith a first address unit for use in conjuction with retrieval of the data words via the first data path;

a second memory for storing offsets;

a second data path coupled to the second memory for use in retrieving offsets therefrom for use in the indirect addressing, the second data path having associated therewith a second address unit for use in conjuction with retrieval of the offsets via the second data path;

the first and second data paths being capable of independent and substantially simultaneous operation such that a data word can be retrieved from the first memory via the first data path during the same instruction cycle in which an offset is retrieved from the second memory via the second data path;

a controller coupled to the first and second data paths, wherein the controller is operative in conjuction with the first address unit and the second address unit during a given one of a plurality of instruction cycles to direct the retrieval during the given instruction cycle of a data word from the first memory via the first data path of the data processing system using a first data address computed at least in part during a previous one of the instruction cycles, wherein during the given instruction cycle a second data address is computed as a function of a base address and a first offset, the first offset being retrieved from the second memory via the second data path of the data processing system during one of (i) the previous one of the instruction cycles, and (ii) another one of the instruction cycles prior to the previous instruction cycle, the second data address being used in another of the instruction cycles subsequent to the given instruction cycle to retrieve another data word from the first memory via the first data path, and to direct the retrieval during the given instruction cycle of a second offset from the second memory via the second data path, the second offset being used in the other of the instruction cycles subsequent to the given instruction cycle to compute a third data address as a function of the base address and the second offset.

* * * * *